Patented Aug. 29, 1933

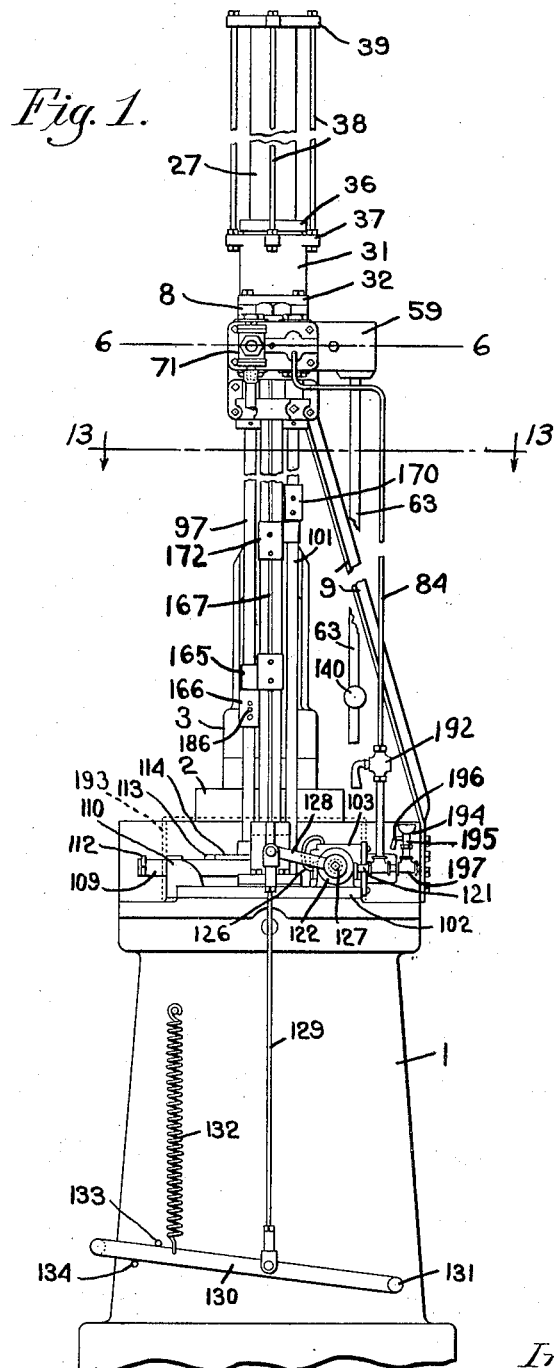

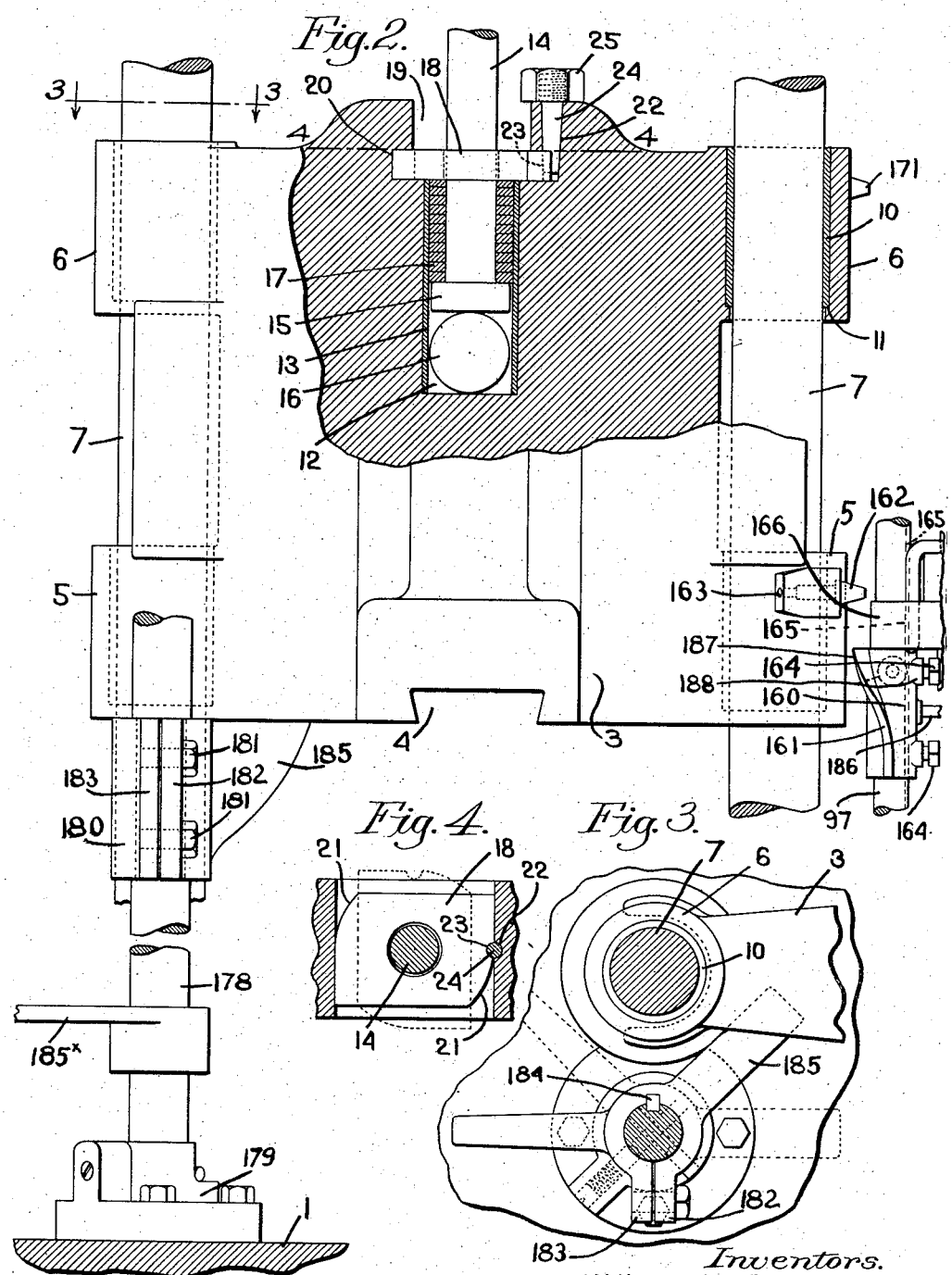

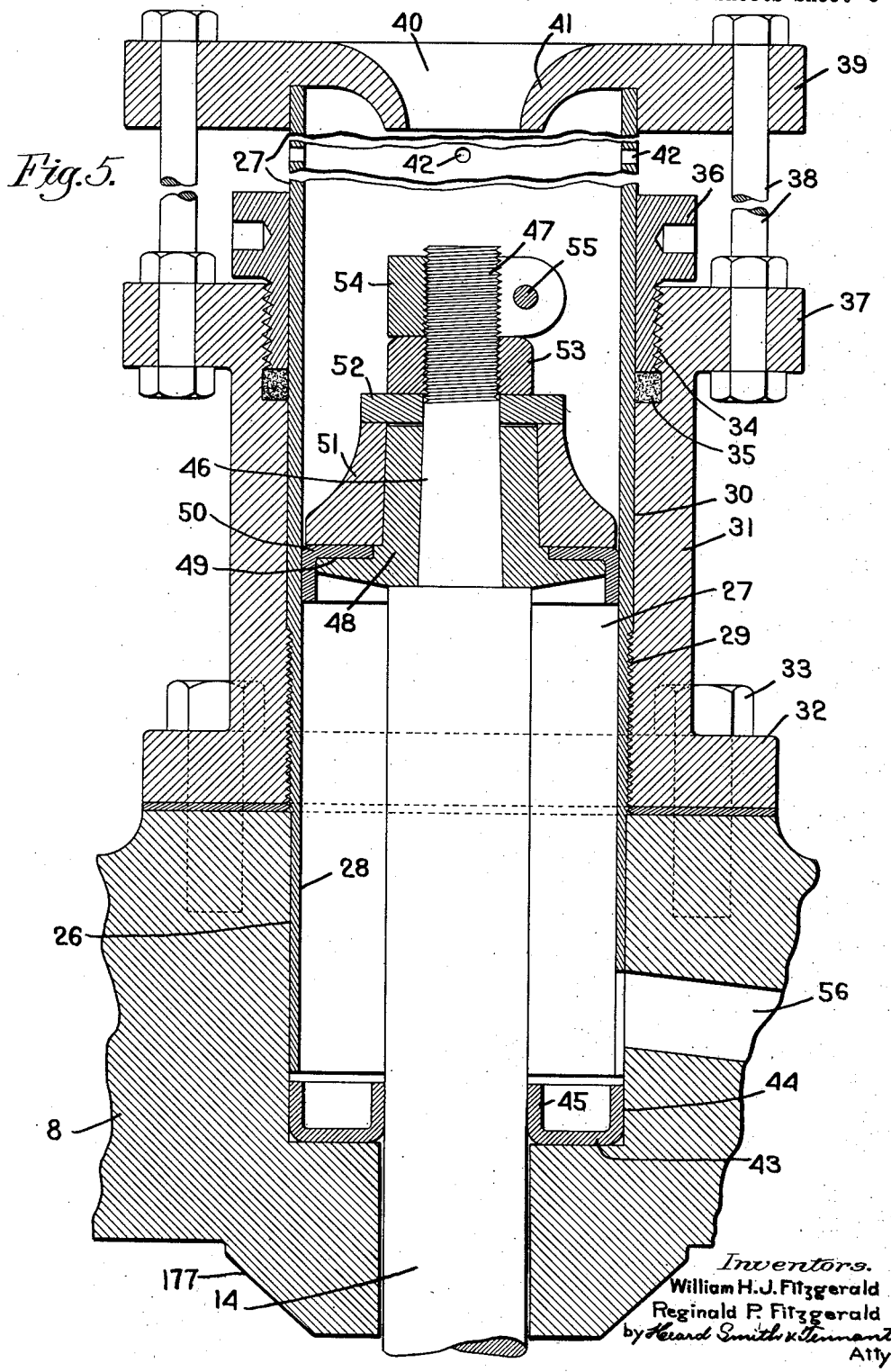

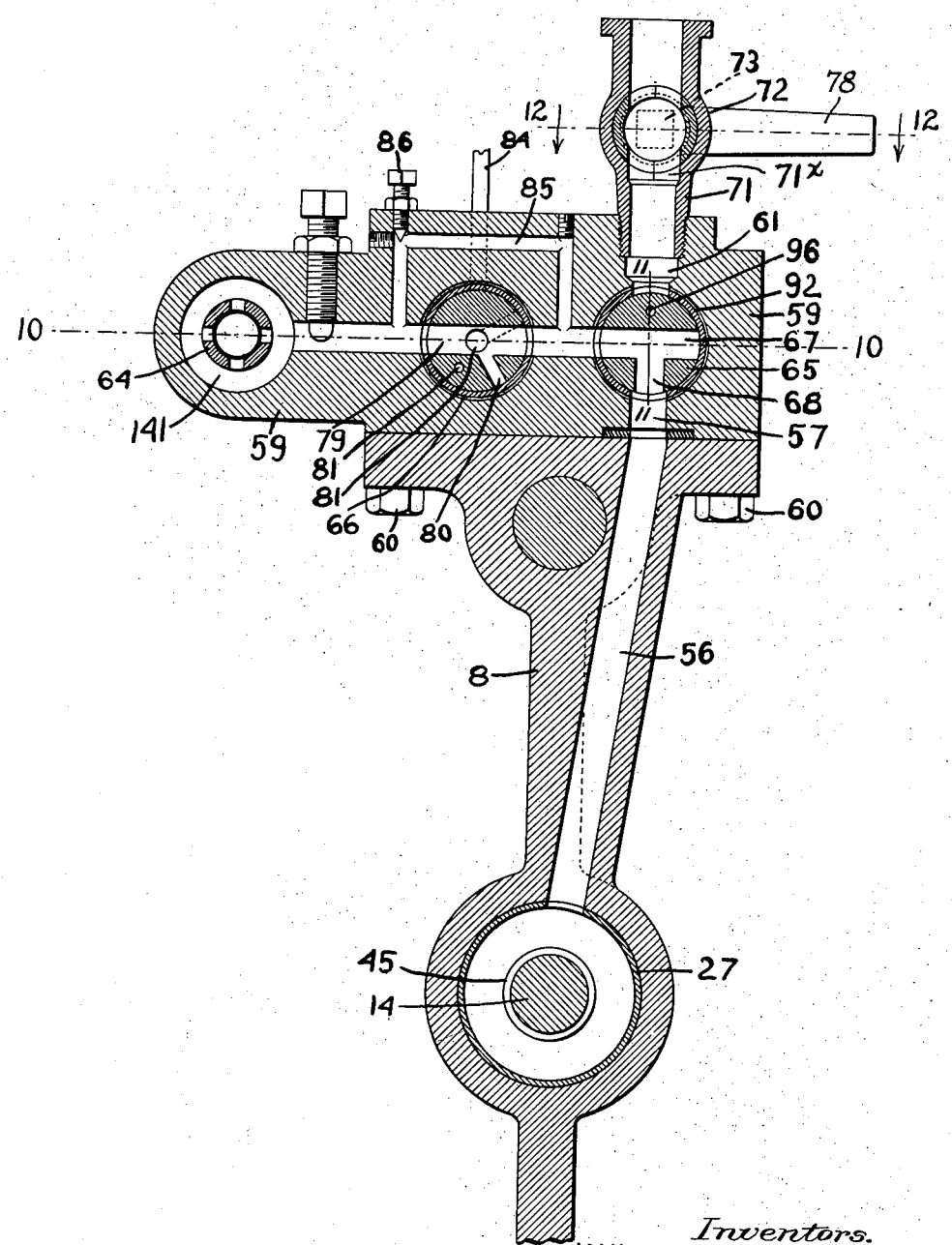

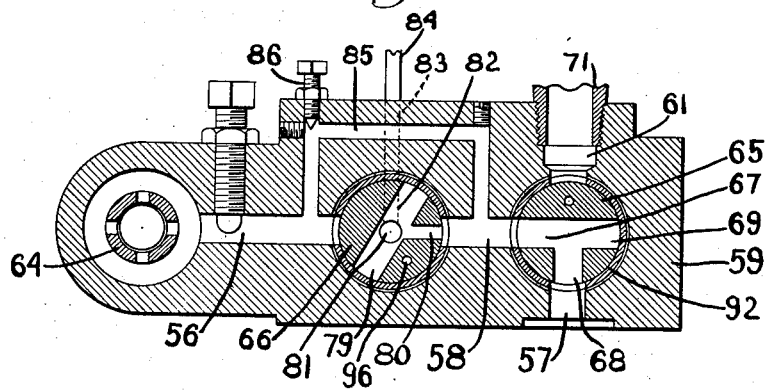
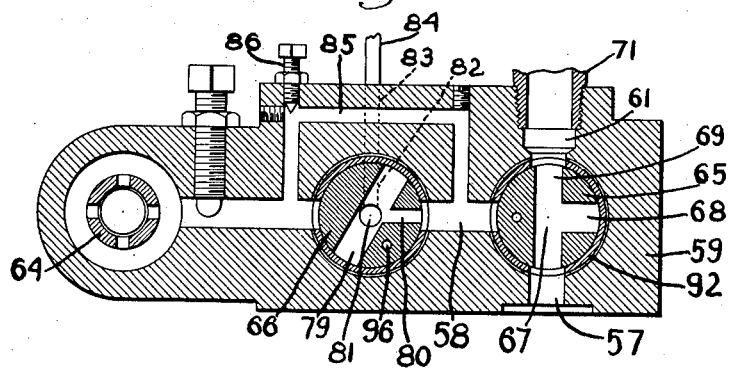
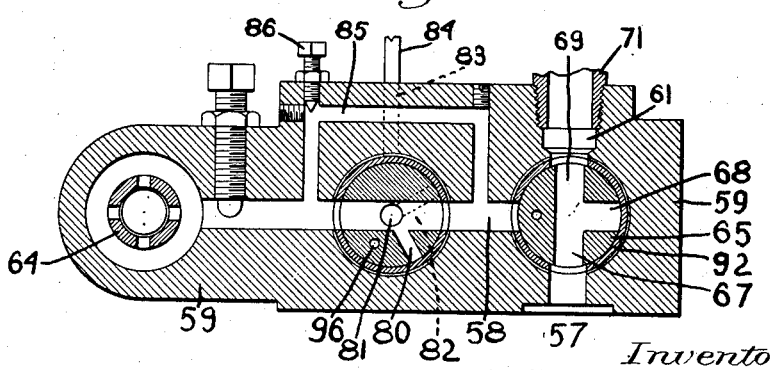

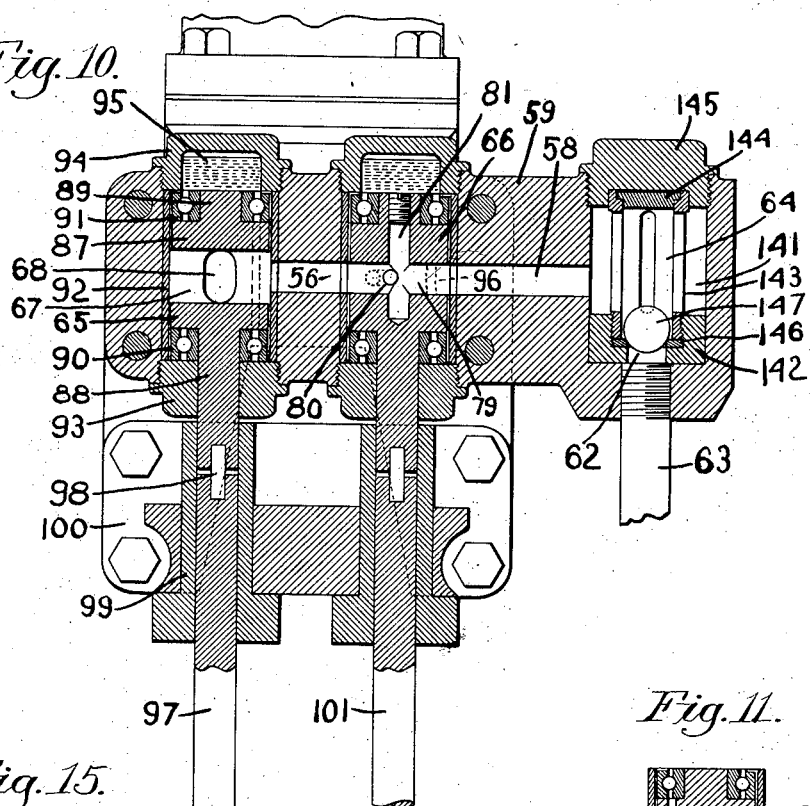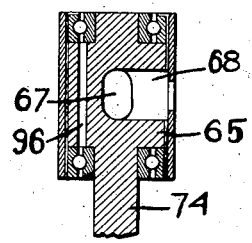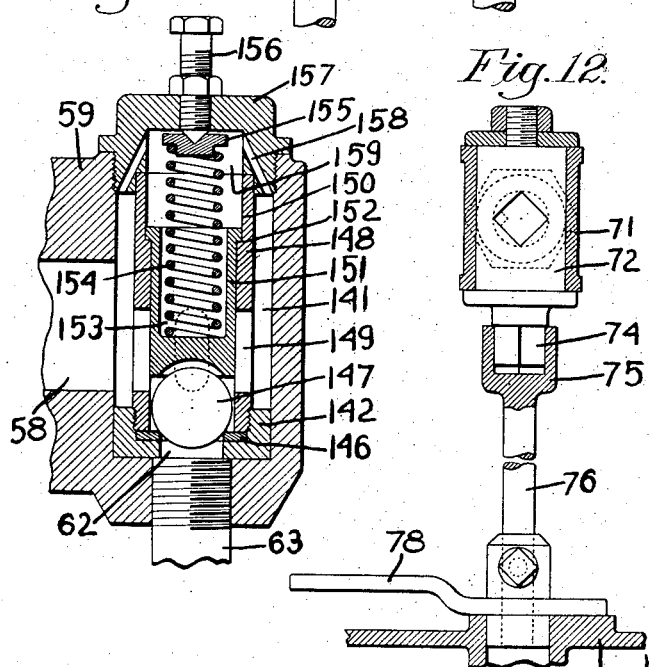

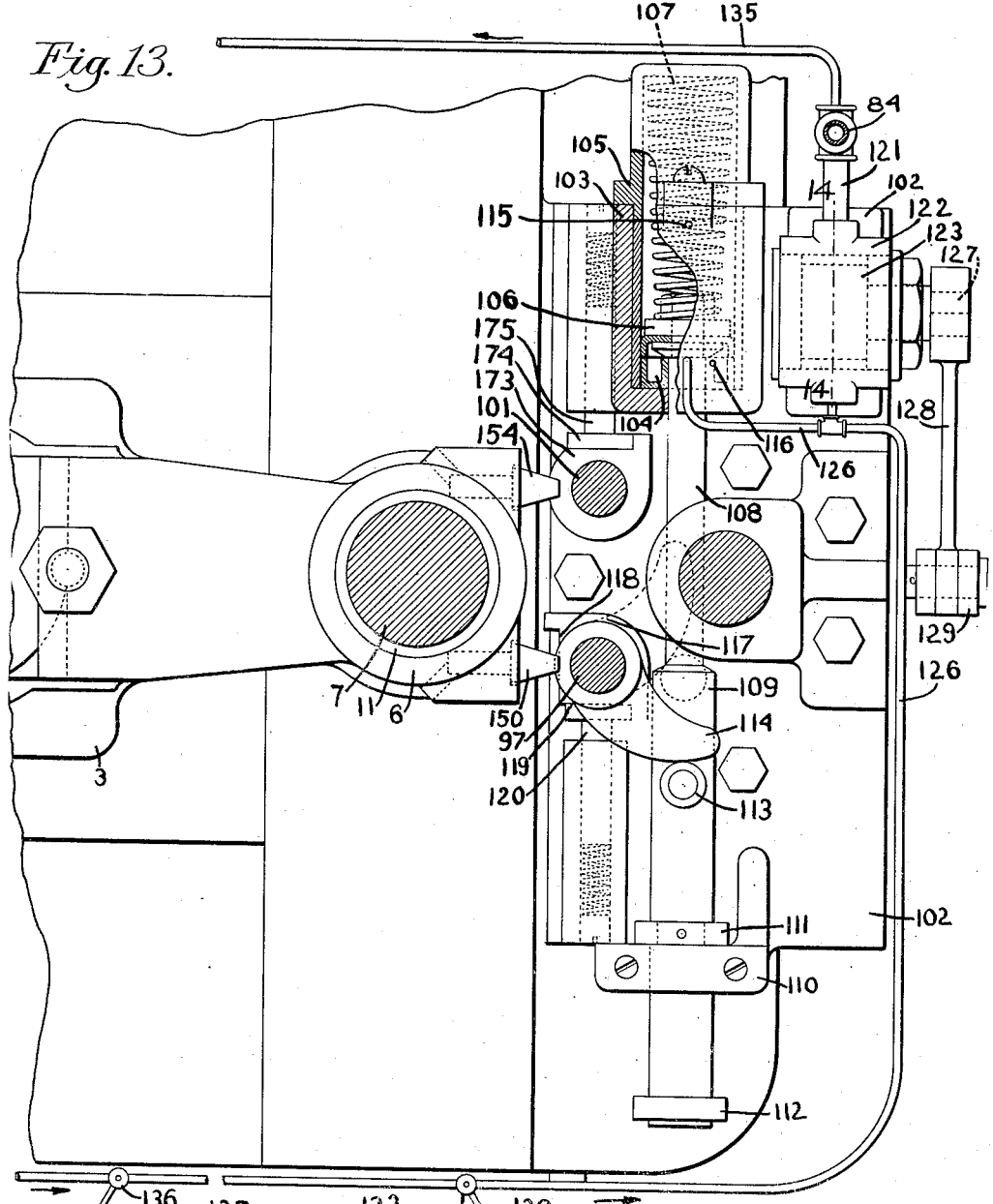
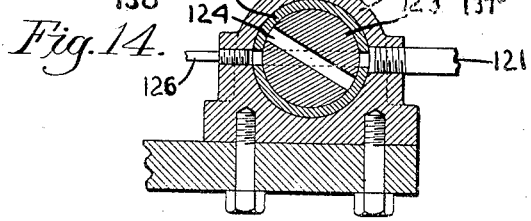

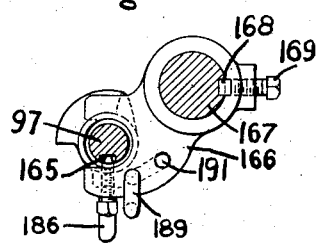
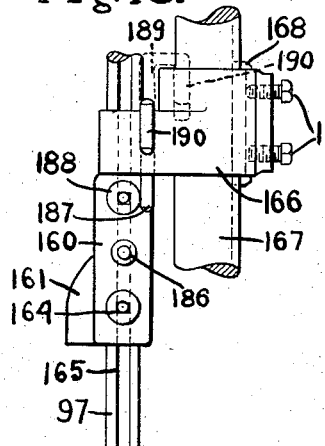
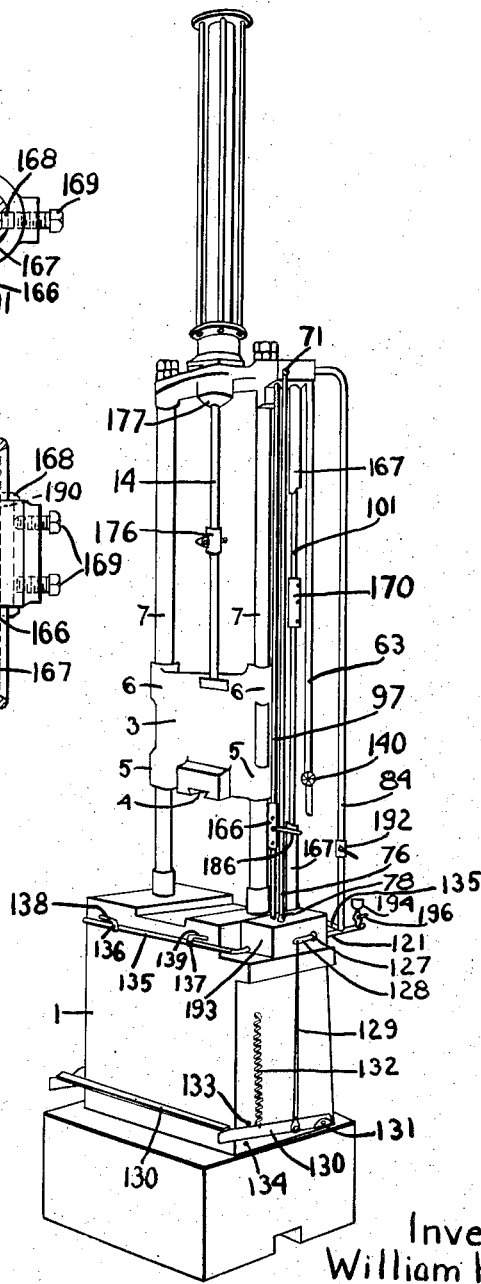

1,924,545

UNITED STATES PATENT OFFICE 1,924,545

DROP HAMMER

William H. J. Fitzgerald and Reginald P. Fitzgerald, Braintree, Mass., assignors to Pneumatic Drop Hammer Company, Boston, Mass., a corporation of Massachusetts Application November 22, 1928
Serial No. 321,225

28 Claims. (Cl. 121—30)

This invention relates to improvements in drop hammers and the general object of the invention is to provide a drop hammer of rigid construction which will operate with exceeding accuracy, which is capable of easy and accurate control, and which will be practically incapable of any improper actuation which is likely to injure the operator.

Drop hammers are used largely for producing die work which requires such control of the hammer that a proper and accurate blow shall be struck, that no "shivering" of the hammer shall take place on impact and a secondary blow avoided; otherwise, the pattern work of the die will be destroyed.

The present invention comprises certain improvements upon the drop hammer construction disclosed in Patent No. 1,722,506, Henning G. Sahlin, granted July 30, 1929.

Drop hammers of the type to which this invention pertains comprise a base or anvil, columns extending vertically upwardly therefrom, a cylinder-supporting beam mounted upon the upper end of said columns, a cylinder supported upon said beam having a piston with a piston rod extending through bearings in said beam and connected to the hammer which is guided in its vertical movement by bearings engaging the vertical columns. Means are provided for introducing fluid under pressure, preferably compressed air, into the cylinder below the piston with valve mechanism including a control valve and a manually actuated operating valve operable to permit the fluid under pressure to enter the cylinder to raise the hammer or to exhaust the fluid therefrom to permit the hammer to drop.

One of the objects of the present invention is to provide a fluid pressure actuated trip mechanism, preferably subject to the pressure of the fluid in the cylinder when the hammer is raised, to actuate the operating valve, with manual means for controlling said trip mechanism.

A further object of the invention is to provide means for supplying fluid to the trip mechanism only when the hammer is raised a predetermined distance above the anvil.

A further object of the invention is to provide means for controlling the trip mechanism which may be operated selectively by a foot pedal or by means which will require the use of both hands of the operator to cause the hammer to drop.

Another object of the invention is to provide means for preventing improper operation of the valve-actuating mechanism which would produce a repeated blow.

Another important object of the invention is to provide valves for controlling the fluid under pressure supplied to the cylinder, with anti-friction bearings adapted to prevent binding of the valves which are subjected to high pressure, and a further object of the invention is to provide means for supplying to the anti-friction bearings of such valves and to the valves themselves a lubricant which will maintain free operation of the valves and also provide an oil seal for the valves.

Another object of the invention is to provide means for accurately adjusting the dropping height of the hammer to produce uniform blows and means for accurately regulating the force of the blow delivered by the hammer.

Another object of the invention is to provide novel check valve mechanism for the fluid intermediate of the supply of fluid under pressure and the operating valve which will prevent improper dropping of the hammer if for any reason the supply of fluid under pressure is discontinued or improperly reduced.

A further object of the invention is to provide a check valve mechanism which will control the volume of fluid supplied to the cylinder to avoid improper lifting of the hammer and injury to the cylinder-supporting beam.

Another important object of the invention is to provide a drop hammer construction having means for accurately guiding the drop hammer and which will prevent shivering of the hammer upon impact.

Another object of the invention is to provide novel means for connecting the piston rod to the hammer which will prevent metal-to-metal contact between the hammer and the piston rod, and will provide, in effect, a universal connection between the piston rod and hammer which will avoid the transmission of binding strains to the bearings which guide the hammer upon the columns.

Another object of the invention is to provide a novel, readily releasable, means for securing the hammer to the piston rod.

Another object of the invention is to provide an improved and rigid mechanism for securing the cylinder to the cylinder-supporting beam, whereby the likelihood of breakage or cracking of the cylinder, or leakage of the fluid under pressure therefrom will be avoided.

Another object of the invention is to provide a novel piston head with means for more securely attaching the same to the piston rod than is found in previous constructions.

Another object of the invention is to provide a novel cap for the cylinder so constructed as to prevent expulsion of oil from the cylinder while permitting air to be forced freely from the upper end of the cylinder during the upward movement of the piston and which cap will also prevent the piston from being blown out of the cylinder in case of detachment of the piston from the piston rod, breakage of the piston rod, or detachment thereof from the hammer.

Another object of the invention is to provide novel means for supporting the hammer at a distance above the anvil to permit the assembling or replacement of the dies.

Another very important object of the invention is to provide such safety devices as will effectively prevent improper operation of the hammer and which will protect the operator from injury.

These and other objects and features of the invention will more fully appear from the following description and the accompanying drawings and will be particularly pointed out in the claims.

In the drawings:

Fig. 1 is a side elevation of the power hammer embodying the present invention;

Fig. 2 is an enlarged detail view, partially in section, showing the manner in which the hammer is mounted upon the columns, the preferred means for connecting the hammer to the piston rod, and means for retaining the hammer in elevated position, and illustrating also the mechanism operable by the hamer to actuate one of the valves for controlling the supply of air to the cylinder;

Fig. 3 is a detail, horizontal sectional view on line 3—3 Fig. 2, looking downwardly, illustrating the mechanism for supporting the hammer in a raised position out of engagement with the anvil, and illustrating in dotted lines the supporting device in inoperative position;

Fig. 4 is a detail view, partly in section on line 4—4 Fig. 2, illustrating the manner in which the breech-block may be connected to and removed from the hammer;

Fig. 5 is an enlarged vertical sectional view of the cylinder and cylinder-supporting beam showing the manner in which the cylinder is mounted upon and rigidly secured to said supporting means, and illustrating also in section a novel piston head and means for packing the piston. In this drawing parts are shown as broken to indicate that the cylinder is of considerably greater length than can be illustrated upon the sheet;

Fig. 6 is a horizontal sectional view, on line 6—6, Fig. 1, through a portion of the cylinder-supporting beam and through the valve block and valves illustrating the manner in which fluid under pressure is introduced into the cylinder, the control and operating valves being shown in position to admit fluid under pressure to the cylinder when the hammer is resting upon the anvil and during the upward movement thereof;

Fig. 7 is a detail horizontal sectional view, on line 6—6, Fig. 1, through the valve block, similar to that illustrated in Fig. 6, showing the control and operating valves in the position which they assume with the hammer raised to dropping position;

Fig. 8 is a horizontal sectional view on line 6—6, Fig. 1, of the valve block and valves illustrating the position of the valves at the time the operating valve is tripped to permit the hammer to descend;

Fig. 9 is a transverse sectional view, on line 6—6 Fig. 1, of the valve block and valves showing the valves in the position they assume during the dropping of the hammer and prior to the rotation of the operating valve into the position shown in Fig. 6 to admit fluid under pressure to the cylinder when the hammer strikes its blow and thereby to continue the lifting of the hammer on its bound from the anvil;

Fig. 10 is a detail view, on line 10—10 Fig. 6, mainly in vertical section, showing the operating and control valves provided with anti-friction bearings and with means for lubricating said bearings and valves, and also illustrating the novel form of check valve for the inlet of fluid under pressure into the conduit in said valve block;

Fig. 11 is an enlarged detail view in cross section on line 13—13 Fig. 1, of the operating valve showing the enlarged port therein communicating with the exhaust;

Fig. 12 is a detail view, partially in vertical section, showing the plug valve for controlling the rate of exhaust from the cylinder and thereby regulating the blow of the hammer;

Fig. 13 is a view mainly in plan, but partly in vertical section, on line 13—13 Fig. 1, illustrating the fluid-actuated trip mechanism for the hammer and the means for controlling the same;

Fig. 14 is a cross sectional view of the controlling valve for the trip mechanism on line 14—14 Fig. 13;

Fig. 15 is an enlarged detail view, mainly in vertical section, of a modified form of check valve for the inlet conduit especially designed for heavy duty hammers;

Fig. 16 is a perspective view of the drop hammer construction;

Fig. 17 is an enlarged detail view, mainly a plan view, showing a safety device for preventing improper operation of the hammer carried by the steadying bracket for the operating valve rod; and, Fig. 18 is an enlarged detail view in side elevation of the same.

The drop hammer which is illustrated in the accompanying drawings, and comprises a preferred embodiment of the invention, is particularly designed for the purpose of producing accurate work from dies, such as the embossing and shaping of silver and other metallic articles upon which delicate designs are impressed.

The drop hammer comprises a massive base or anvil 1, having a die holder 2 and a hammer 3 having a suitable recess 4 to receive the upper die, see Fig. 2, and also laterally extending lower and upper bearings 5 and 6 which are widely spaced apart and are slidably mounted upon accurately finished cylindrical steel columns 7 which are rigidly secured at their lower ends in the base and at their upper ends are connected by a heavy metallic cylinder-supporting beam 8. Brace rods 9, connected at their upper ends to the cylinder-supporting beam and at their lower ends rigidly anchored to the base, are provided to insure stability of construction and to prevent lateral vibration during the operation of the hammer.

The cylinder, which is mounted upon the cylinder-supporting beam 8, is provided with a piston having a piston rod connected to the hammer and means are provided for introducing fluid under pressure into the cylinder to raise the hammer and for exhausting said fluid to permit the hammer to drop, as is usual in drop hammer constructions, but special mechanisms are provided by the present invention for insuring accurate movement of the hammer, and also for permitting easy and accurate control of the movement of the hammer, as will be hereinafter more fully explained.

One of the important objects of the invention is to provide means which will accurately guide the hammer in its vertical movement and prevent shivering of the hammer upon impact. This is accomplished in the present invention by providing the bearing members 5 and 6 of the hammer, which are reciprocably mounted upon the accurately finished columns 7, with special bushings adapted to maintain a perfect sliding fit between the bearings and the columns. This is produced by counterboring each of the bearing members 5 and 6 from their upper ends downwardly nearly to the lower ends thereof and filling the counterbore with a metallic bushing, preferably of a high speed bronze alloy, 10, the lower end of which rests upon the shoulder 11 of the annular flange formed at the bottom of the bearing member. This flange prevents the bushing from being displaced by the jar of the hammer and also causes the repeated jars, produced by the hammer, to condense the metal of the bushing so that it will maintain a perfect sliding fit upon the column.

In order further to insure accuracy of movement of the hammer and prevent possible binding of the bearings a flexible connection is provided between the hammer and the piston rod which will avoid a metal-to-metal contact therebetween and which, in effect, will provide a universal joint adapted to permit the hammer to move freely upon the columns without any binding action due to misalinement of the axis of the piston with the vertical movement of the hammer.

In the preferred construction illustrated, (see Fig. 2), the hammer is provided, centrally between the columns, with a vertical recess 12 extending downwardly from the upper face of the hammer well into the body thereof. Desirably the cylindrical bushing 13 is fitted in said recess. The piston rod 14 is provided with a flanged lower end 15 which is of smaller diameter than the diameter of the bushing 13. A mass of resilient material 16, such as rubber, preferably in the form of a sphere, and which does not fill the recess laterally, is interposed between the flat lower face of the flanged end of the piston and the bottom of the recess 12 and engages the end of the piston axially thereof. A series of washers 17 of fibrous material, which are interposed between the upper face of the flanged end 15 of the piston rod and a breech-block 18, provides a universal joint support between the piston rod and piston which avoids metal-to-metal contact between the piston rod and the hammer. This connection is adapted so to dissipate shocks which occur upon the dropping and lifting of the hammer as to reduce the likelihood of crystallization of the piston rod.

A novel mechanism is provided for detachably securing the breech-block 18 to the hammer. In the preferred construction illustrated the wall of the recess extending into the hammer is provided with a countersink 19 extending downwardly from the upper face of the hammer and the lower portion of the countersink is provided with a lateral drift or recess 20 providing a seat for the breech-block 18.

The breech-block 18 is of general rectangular form and is provided with diametrically opposite curved corner portions 21 which enable the breech-block to be introduced into the countersink 19, as illustrated in dotted lines in Fig. 4, and thereupon to be rotated a quarter turn into the recess 20, as illustrated in full lines in Fig. 4, so that the ends of the breech-block will lie in the recess 20 of the hammer and the breech-block retained firmly within the hammer. In order to prevent displacement of the breech-block a preferably tapered hole 22 extends downwardly from the upper face of the hammer to intersect the outer wall of the recess 20 and the breech-block 18 is provided with a socket 23 complementary to the hole in the wall of the recess to receive a tapered locking pin 24 adapted when driven in place to lock the breech-block in position. The upper end of the pin 24 is of cylindrical form and provided with screw threads adapted to receive an extracting nut 25 which, when rotated in the proper direction, will readily withdraw the tapered pin and thus permit rotation and removal of the breech-block.

The piston rod 14 extends loosely through suitable apertures in the cylinder-supporting beam 8 and breech-block 18 and is connected at its upper end to the piston which is reciprocable in the vertical cylinder carried by the beam 8 and is actuated to raise the hammer by fluid under pressure introduced into said cylinder beneath the piston.

In usual drop hammer constructions the connection between the lower end of the cylinder and the cylinder-supporting beam has been such that the vibration of the cylinder, caused by the reciprocation and impact of the hammer, has produced leakage of the fluid under pressure from the cylinder and in many instances has caused a breakage of the cylinder.

An important object of the present invention is to provide a novel mechanism for mounting the cylinder upon the cylinder-supporting beam which will avoid vibration and leakage of the fluid under pressure from the cylinder and a further object of the invention is to provide a cap for the cylinder which will prevent expulsion of oil from the upper end of the cylinder during the reciprocation of the piston, and a further feature of the invention consists in providing such a construction that the cap will restrain the piston from being projected out of the upper end of the cylinder if it becomes detached from the piston rod if the piston rod should break.

A cylindrical recess 26 extends downwardly from the central portion of the upper surface of the beam 8 well into the body of the beam and the cylinder 27 is so constructed as to extend preferably nearly to the bottom of the recess 26.

Desirably the cylinder is of special construction having a lower wall section 28 fitting the wall of the recess 26 and a slightly thicker wall section 29 above said recess having a screw threaded periphery and an upper plain section 30 which may be of the same thickness as the maximum thickness of the screw threaded portion 29.

In order to re-enforce the connection between the lower end of the cylinder 27 and the cylinder-supporting beam 8, a wide and heavy sleeve 31 is provided which fits tightly upon the cylinder, and is provided at its lower end with a laterally extending flange 32 which is secured by suitable heavy bolts 33 to the beam 8, a gasket of fibrous material being interposed between the flange 32 and the beam 8 to prevent leakage of fluid under pressure through the joint. The lower portion of this sleeve desirably is provided with internal screw threads to engage the screw threads 29 upon the cylinder. The upper end of the sleeve 31 is provided with a counterbore having a screw threaded wall 34. A packing 35 is introduced into the lower end of the recess formed by the counterbore and a gland 36, fitting upon the cylinder and having peripheral screw threads engaging the screw threads 34, serves to force the packing 35 firmly into engagement with the wall of the cylinder so that any possibility of leakage of fluid under pressure between the cylinder and the sleeve is prevented.

The upper end of the sleeve 31 desirably is provided with a laterally extending flange 37 forming an anchorage for tie rods 38 which are connected at their upper end to a cap 39 which rests upon the upper end of the cylinder 29. The tie rods 38 are provided with suitable nuts and are adapted when set up to force the cap firmly against the cylinder and thereby increase the rigidity of the construction.

Desirably the under side of the cap 39 is provided with a cylindrical recess to receive the upper end of the cylinder 27 and the central portion of the cap is provided with an aperture 40 to provide a vent to permit the escape of air from the upper portion of the cylinder when the piston is raised, and thereby prevent back pressure.

The portion of the cap within the cylinder desirably is so constructed as to present a downwardly curved wall 41 extending inwardly a considerable distance from the wall of the cylinder and providing a baffle which will prevent the expulsion of oil from the cylinder and which will return it thereto while permitting air to escape through the central aperture.

The cap 39 is of rigid construction and is rigidly connected to the cylinder-supporting beam and is adapted to prevent the piston from being blown out of the upper end of the cylinder if the piston should become detached from the piston rod, or the piston rod should break. A plurality of large vent ports 42 are provided in the cylinder wall above the normal range of movement of the piston to permit rapid escape of fluid pressure from the cylinder if the piston is raised above such ports, thereby reducing the pressure upon the piston sufficiently to prevent serious injury to the cap in event of breakage of the piston rod or detachment thereof from the hammer.

Another feature of the invention consists in providing an improved packing at the lower end of the cylinder which will prevent escape of fluid under pressure through the bearing for the piston rod in the beam 8. In the construction illustrated herein the lower end of the cylinder 27 is located a short distance above the lower end of the recess 26 in the beam 8. A packing of fibrous material in the shape of a U-packing 43 is seated within the portion of the recess below the end of the cylinder with the outer wall 44 thereof confined by the wall of the recess and the inner annular wall 45 thereof engaging the piston rod 14.

By reason of this construction the fluid under pressure which is introduced into the cylinder tends to expand the fibrous U-packing and forces the inner wall 45 thereof into, and maintains the same in, tight engagement with the piston rod, thereby preventing leakage of fluid under pressure along the piston rod. Obviously the cylinder may be extended to the lower end of the recess in which case the outer wall 44 of the packing member will be confined by the wall of the cylinder.

Another feature of the invention consists in providing a novel piston construction.

In usual constructions the upper end of the piston rod is reduced in diameter to present a shoulder upon which a washer is seated and the packing for the piston is clamped between this washer and the piston head which is in the form of a sleeve and is engaged at its upper end by nuts upon the end of the piston rod.

In such constructions the jar from repeated blows of the hammer has been found to loosen the sleeve and to strip the nuts. By the present invention the piston head is so constructed as to prevent the head from becoming loose upon the piston rod.

In the preferred construction illustrated herein the upper end of the piston rod is provided with a reduced, slightly tapered, section 46 terminating in a screw threaded end portion 47. The piston head comprises a long sleeve 48 which fits upon the section 46 of the piston rod and has a flat, circular face engaging the shoulder of the piston rod at the lower end of said reduced section. The under face of the sleeve may be beveled upwardly from the shoulder. The upper face of the sleeve is provided with a peripheral annular recess 49 which receives the horizontal flange of an annular packing 50, the skirt of which fits and engages the wall of the cylinder. A sleeve 51, of nearly the full diameter of the cylinder, slidably fits upon the sleeve 48 and extends slightly above the upper end of the sleeve 48 of the piston head. A disk or washer 52 engages the upper end of the sleeve 51 and the parts are clamped together by a clamping nut 53 upon the screw threaded end portion of the piston rod which in turn is secured against rotation by a split lock nut 54 having ears which are clamped together by a bolt 55. By reason of this construction a piston head is provided in which the parts will not become loosened by the jars produced by the blows of the hammer. The construction is such, however, that the parts may be readily assembled and replaced when the packing becomes worn.

One of the most important objects of the invention is to provide novel means for controlling the introduction of fluid under pressure into the cylinder to raise the hammer, together with improved means for exhausting the fluid therefrom to permit the hammer to drop.

In the construction illustrated fluid under pressure is introduced into the cylinder through a conduit 56 which preferably is formed in the cylinder-supporting beam 8 and leads from the cylinder lengthwise of one of the arms of the beam and communicates at its outer end with a branch 57 of an inlet conduit 58 in a valve box or block 59 which is rigidly secured to flanges upon the end of the beam by bolts 60, (Fig. 6). The conduit 58 is provided with an exhaust branch 61 which desirably is in direct alinement with the branch 57 leading to the cylinder so that fluid under pressure, when exhausted, will flow more freely from the cylinder in a direct line than it would if the exhaust port were disposed at an angle to the port leading from the cylinder. The opposite end of the conduit 58 communicates with an inlet port 62 through which fluid under pressure, preferably air, is introduced through a pipe 63, (see Fig. 10). A check valve 64 is provided at the inlet port to prevent the sudden escape of fluid under pressure from the cylinder and the consequent rapid dropping of the hammer in case of breakage in the pressure supply line.

The supply of fluid under pressure to the cylinder and the exhaust therefrom is controlled by an operating valve 65 and the flow of fluid under pressure in the conduit 58 from the inlet to the operating valve is regulated by a control valve 66 intermediate of the fluid pressure inlet and the operating valve in a manner generally similar to that of the construction disclosed in the patent to Sahlin above mentioned. In that construction mechanical means were provided for actuating the operating and control valves.

A very important object of the present invention is to provide means operable by the fluid under pressure, which is supplied to the cylinder, for actuating the operating valve, in combination with means for actuating the control valve in a proper sequence to the movements of the operating valve to provide an accurate and easy control of the movement of the hammer.

The operating and control valves may be of any desired form and operated in any suitable manner to perform the functions herein described.

In the preferred embodiment of the invention illustrated herein the operating and control valves are of vertical cylindrical form and are rotatably mounted in the valve block 59. The operating valve 65 is provided with a port 67 extending diametrically therethrough and with a lateral port 68 extending at right angles thereto. The port 67 when in alinement with the conduit 58 will supply fluid under pressure through the lateral port 68 to the cylinder when in the position illustrated in Figs. 6 and 7.

When the valve is rotated ninety degrees flow of fluid from the conduit 58 is prevented and the port 67, which extends diametrically through the valve, establishes communication between the conduit 56 from the cylinder and the exhaust port and permits the passage of the fluid in the cylinder directly out of the exhaust port. In order to facilitate the exhaust, the port 67 is enlarged, preferably being elongated to substantially elliptical form, as illustrated in Fig. 11, and the exhaust port 61 in the block is enlarged to a cross sectional area of at least the same area.

Means desirably are provided for regulating the rate of exhaust of the fluid under pressure from the cylinder and consequently the force of the blow of the hammer. This is accomplished in the present invention by providing an exhaust conduit in the form of a nozzle 71 screwed into the valve block 59, (see Fig. 6). The valve block 59 is provided with a preferably rectangular passage and a vertical cylindrical valve 72 having angular ports therethrough, preferably in the form of a rectangle or rhombus, is rotatably mounted in said block 59 transversely of the rectangular passage therein, (see Figs. 6 and 12). By reason of this construction the exhaust valve 72 may be accurately positioned to provide any desirable effective cross sectional area for the escape of the fluid under pressure and, of course, the hammer will be permitted to descend only in proportion to the rate at which the fluid under pressure escapes.

The valve 72, as illustrated in Fig. 12, is of cylindrical form and extends through the nozzle 71, and is provided at its lower end with a rectangular stem 74 which engages a socket 75 in a vertical operating rod 76 which is rotatably mounted at its lower end in a boss 77 on the frame and is provided with an operating lever 78 by which the valve may be adjusted. The connections 74 and 75 between the valve and the rod 76 permits sufficient flexibility to avoid binding of the valve which otherwise might occur from the vibration of the machine when in operation.

Suitable means are provided for actuating the operating valve and the control valve in proper sequence to control the movement of the hammer. In the present invention fluid operable means are provided for actuating the operating valves. The control valve 66, which is also a vertical rotatable valve, is provided with a port 79 extending diametrically therethrough, adapted to establish communication between the inlet and the operating valve, and is also provided with a lateral port 80 adapted to commnicate with the portion of the conduit 58 between the control valve and the operating valve. The control valve has an axial central bore 81 which extends below the diametrical port 79 and leads to a lateral port 82 which communicates with a conduit 83 having a pipe 84 leading therefrom to supply fluid to the mechanism for actuating the operating valve.

The arrangement of the ports 79, 80, and 82, in the control valve desirably is such that fluid under pressure will be supplied to the mechanism for actuating the operating valve only from the fluid pressure of the cylinder and not from the fluid pressure of the supply line.

The mechanism for actuating the control valve is such that when the hammer has been raised to a predetermined height the control valve 66 will be rotated to a position to cut off communication between the supply pipe and the operating valve as illustrated in Fig. 7 and establish communication from the cylinder through the ports 80, 81, and 82, of the control valve 66, with the pipe 84 which leads to the trip mechanism for actuating the operating valve 65. As the valve 66 is positioned to cut off the supply of fluid under pressure when the piston is in raised position, fluid under sufficient pressure to actuate the trip mechanism is supplied through the pipe 84 only when the piston—and consequently the hammer—is in raised position. The trip mechanism cannot be improperly actuated either mechanically or automatically during the raising of the hammer to strike an improper uncontrolled blow. Desirably a by-pass 85, controlled by a needle valve 86, is provided around the control valve 66 gradually to supply sufficient fluid under pressure to the cylinder to compensate for leakage and thereby maintain the hammer in raised position and also to insure a supply of fluid pressure to the mechanism for actuating the operating valve which will hereinafter be more fully described.

In previous constructions in which cylindrical control valves have been employed in drop hammers, it has been found that the high fluid pressure required has forced the lubricant from the bearings of the vave, thus increasing the friction between the valves and their bearings, and that the lateral pressure of the fluid against the valves has caused them to bind.

Another important object of the invention is to provide a novel valve construction having antifriction bearings and in which an oil seal is provided between the valve and its bearing. Inasmuch as the same construction is applicable to both the operating and control valves the description of the construction of one of such bearings will suffice for both.

The preferred bearing construction is illustrated in Fig. 10 in which the body 87 of the valve is of integral construction and provided with a downwardly extending cylindrical stem 88 and an upwardly extending cylindrical boss 89. Lower and upper ball bearings 90 and 91 are interposed respectively between the stem 88 and boss 89 and a sleeve or bushing 92 for the valve. These ball bearings fit tightly within the sleeve while the body of the valve is of a very slightly reduced diameter such as .00075 of an inch, thereby providing sufficient tolerance to insure the free rotation of the valve with its periphery out of frictional contact with said sleeve and sufficient closeness to an exact fit to enable lubricant supplied to the valve to provide an oil seal. The lower end of the aperture in the valve block is sealed by a plug 93, while the upper end of said aperture is provided with a hollow cap 94 which has screw threaded engagement with the wall of the aperture and provides a reservoir 95 for a lubricant. The diameter of the chamber in the cap desirably is such that the oil may feed directly by the action of gravity into the upper ball bearings and from said bearings between the body of the valve and the sleeve. A vertical duct 96 in the body of the valve leads from the upper ball race to the lower ball race, thereby supplying lubricant to the lower ball bearing. The lower end of the valve stem 88 is flexibly connected to an operating rod 97 by a key 98 located in alined slots in the adjacent ends of the stem and operating rod. A sleeve 99, enclosing this connection, is mounted in a suitable bracket 100 connected to the valve box.

As before stated the control valve is similarly constructed and its stem is connected to an operating rod 101 in the manner above described.

As above stated, a very important feature of the present invention comprises means operated by fluid pressure for actuating the operating valve. The preferred mechanism for this purpose is shown in Fig. 1 and in detail in Fig. 13 and comprises a plate 102 which is mounted upon a ledge upon the base 1 of the drop hammer, having formed integral therewith and extending upwardly therefrom a cylindrical casing 103 having a closed inner end and provided with a cylindrical lining or bushing which engages the end of a hollow cap 105 secured to the open end of the cylinder. The cylindrical chamber 104 of the casing is provided with a piston 106, having suitable packing, which is reciprocably mounted in the cylinder and is engaged by a conical spiral spring 107, the opposite end of which extends into the cap 105 and is seated against the end wall thereof. A piston rod 108 extends through the closed end of the cylinder 103 and is provided with or connected to an enlarged, preferably rectangular portion 109 which is slidably mounted in bearings in a bracket 110 mounted upon the plate 102. The section 109 of the piston rod desirably is provided with inner and outer stops 111 and 112 to limit the movement of the piston. The section 109 of the piston rod is provided with an upwardly extending stud 113 desirably having an anti-friction roller thereon which is adapted to engage a convexedly curved cam face of an arm 114 which is connected to and extends laterally from the rod 97 which is connected to the operating valve 65.

When fluid under pressure is introduced into the chamber 104 the piston 106 will be forced backwardly or outwardly thereby causing the stud 113 to engage and actuate the arm 114 to rotate the operating valve from normal position, for raising the hammer, to exhaust portion to permit the hammer to drop. The fluid under pressure thus introduced into the chamber 104 forces the piston outwardly against the tension of the spring 107. The cylinder 103 is provided with an exhaust port 115 which when the piston is forced back sufficiently to uncover it will permit the fluid under pressure rapidly to escape from the chamber. The cylinder also is provided near its inner end with a smaller, preferably adjustable, exhaust port 116 which is continuously in communication with the chamber 104 operable to reduce the pressure of the fluid supplied to the chamber 104 from the amount of fluid pressure of the hammer-raising cylinder to that required properly to actuate the piston 106 of the exhaust valve controlling mechanism and to prevent building up of such pressure in the chamber 104, after the trip valve is closed, by the expansion of the fluid under pressure therein, or by leakage around the trip valve as might actuate the piston 106 to produce an undesired repeated blow. The exhaust port 116 also permits the escape of fluid under pressure after the trip valve is closed with sufficient rapidity to permit the spring 107 quickly to restore the piston 106 to normal position as illustrated in Fig. 13.

In order to provide means for causing a quick final movement of the operating valve, the valve-actuating rod 97 has secured adjacent its lower end a block 117 which is provided with flat faces 118 and 119 disposed at right angles to each other which are adapted to be engaged by a spring-pressed plunger 120 when the valve rod has been rotated sufficiently to cause the corner, formed by the junction of the flat surfaces, to pass by the longitudinal axis of the spring-pressed plunger 120.

Alternative means are provided in the present invention for controlling the admission of fluid under pressure to the mechanism above described for actuating the operating valve, one means being a pedal control, and the other means being controlling mechanism which requires the necessary use of both hands of the operator to cause the dropping of the hammer, as in some instances, particularly where unskilled operators are employed, it is desirable that both hands of the operator shall be employed, in order to avoid possible injury to a free hand.

In the preferred construction illustrated in the accompanying drawings the pipe 84, which communicates with the conduit 58 through the control valve 66, leads to a pipe 121, (see Figs. 13 and 16), which communicates with the casing 122 of a plug trip valve 123 having a diametrical port 124, (see Fig. 14). A bushing 125 desirably is interposed between the casing and the bushing. A pipe 126 leads from the casing to the chamber 130 of the valve-actuating mechanism.

The stem 127 of the valve 123 has an arm 128 which is connected by a link 129, (see Fig. 1), to a pedal 130 which is fulcrumed upon a stud 131 at the lower portion of the base and is normally maintained in raised position by a spiral spring 132, the upward movement thereof being limited by a stud 133 projecting from the base. Desirably the base is provided with a pin hole to receive a pin 134 adapted to lock the pedal against movement when it is desired to prevent operation of the hammer by the pedal control, and to operate it by the hand control.

The pipe 84, which supplies air under pressure to the casing 122 of the pedal-actuated trip valve 123, also communicates with a pipe 135 which may extend around the base, as illustrated in Figs. 13 and 16, and which communicates with the pipe 126 leading to the chamber 104, and which is provided with manually operable valves 150

136 and 137 having handles 138 and 139 respectively, both of which must be pressed to open position by the hands of the operator to open the valves in order to admit fluid under pressure into the chamber of the mechanism which actuates the operating valve. A safety valve 192 is provided in the pipe 84 by means of which the fluid under pressure may be wholly shut off from both trip mechanisms and effective operation of these mechanisms prevented.

When fluid under pressure is admitted into the chamber 104 of the actuating mechanism for the operating valve, the piston is moved (toward the right Fig. 13) in such a manner as to rotate the rod 97 and the operating valve from the position in which the operating valve establishes communication between the cylinder and the conduit 58—which supplies fluid under pressure to it to raise the hammer, as illustrated in Figs. 6 and 7,—to the position in which said valve cuts off such communication and establishes communication between the cylinder and exhaust to drop the hammer, as is illustrated in Fig. 8.

Another object of the invention above stated is to provide novel means for preventing improper dropping of the hammer if the supply of fluid under pressure is discontinued or improperly reduced.

Fluid under pressure is supplied from a suitable source through the pipe 63 which leads to the inlet 62 of the conduit 58. The pipe 63 is provided with a manually operable valve 140 which is only opened when the hammer is in use.

The inlet to the valve box or casing is provided with an enlarged chamber 141 containing a check valve of improved construction which is not subject to injury or breakage as in usual constructions, which is more effective in operation, and which is employed to prevent dropping of the hammer upon failure of air supply.

A preferred construction, which is illustrated in detail in Fig. 10, comprises a cylindrical plug or sleeve 142 having an aperture therethrough with the wall thereof countersunk and screw threaded to receive the lower end of a valve cage 143 which preferably is of cylindrical form and is provided with a series of vertical slots forming ports which communicate with the interior of the chamber 141 and consequently with the conduit 58. The upper end of the valve cage is countersunk to receive a fibre buffer 144 and a plug 145 having a recess to receive and fit the upper end of the valve cage and is screwed into the wall of the chamber 141 to retain the valve cage in position. A valve seat 146, preferably of copper, is clamped between the lower end of the valve cage and the shoulder at the bottom of the countersink in the plug 142. A ball valve 147, preferably of steel or other hard material, is contained in the valve cage and is freely movable vertically therein and normally engages the valve seat which is located a considerable distance below the conduit 58.

When fluid under pressure is introduced into the pipe 63 the ball is raised by the fluid and may be projected against the buffer at the upper end of the ball casing which cushions the shock and prevents injury to the ball. After the flow of fluid under pressure has been established the ball is sustained upon the column of fluid flowing from the pipe 63 into the chamber 141.

The ball, however, because of its weight will descend a portion of the distance toward its seat until its weight is balanced by the pressure of the fluid flowing through the inlet and will restrict, to a greater or less degree, the area of the lateral ports in the valve cage through which the fluid under pressure passes into the chamber 141 and from it to the conduit 58 and will thereby control, to a considerable extent, the volume of fluid which passes to the cylinder at the pressure required to raise the hammer and to sustain it in raised position.

It has heretofore been pointed out that one of the essential features of the present invention is to provide means for supplying fluid under full pressure to the cylinder when the hammer strikes its blow so that the hammer will be caught upon its bound from the anvil by the fluid under pressure entering the cylinder and such fluid under pressure causes a continuing upward movement of the hammer. By thus taking advantage of the bound of the hammer from the anvil in lifting the hammer a great saving of power is accomplished. Where the hammer is employed for forging material of low resilience, such as hot materials, the hammer will bound little if at all, and if fluid under full pressure is admitted to the cylinder when the hammer strikes its blow the pressure and expansive force of the fluid, which is necessarily introduced at a greater pressure than that required to raise the hammer, will tend by its expansion, after the supply of fluid is substantially shut off, to force the hammer upwardly beyond the desired upward limit of movement and this, together with the momentum of the hammer, will be likely to cause the stop collar upon the piston rod of the hammer to strike the cylinder-supporting beam with excessive force.

In Fig. 15 a modified form of inlet valve construction is illustrated which is particularly adapted for use where hammers are employed upon hot work in which there is substantially no bound and which will serve to restrict the admission of air into the cylinder during the upward movement so that the hammer will gradually come to rest at the predetermined height without the likelihood that an excessive blow will be given to the cylinder-supporting beam.

This construction is also desirable where heavy hammers are employed which required fluid under high pressure and in which the hammer during its movement acquires a very considerable momentum.

The construction illustrated in Fig. 15 is similar to that illustrated in Fig. 10 in that the valve block 59 is provided with a chamber 141 having at its lower end a cylindrical plug or sleeve 142 having an aperture therethrough with the wall thereof countersunk and screw threaded to receive the lower end of a cylindrical valve cage with a valve seat 146, preferably of copper, clamped between the lower end of the valve cage and the shoulder at the bottom of the countersink in the plug 142.

In the construction disclosed in Fig. 15, however, the valve cage 148 is provided with vertical slots forming ports 149 of shorter length than those illustrated in Fig. 10 and the valve cage is countersunk from its upper end to provide an enlarged countersink or bore 150.

A piston 151 is slidably mounted in the valve cage and is provided with an enlarged upper end presenting a shoulder 152 adapted to engage a shoulder formed at the lower end of the countersink 150. The piston 151 desirably is recessed axially from its upper end to provide a socket 153 for a spiral spring 154, the upper end of which engages an adjustable plate 155 having a central, preferably conoidal, socket engaged by the end of an adjusting screw 156 which is mounted in the cap 157 of the chamber 141.

The cap 157 is provided at its lower end with a screw threaded periphery which engages internal screw threads in the wall of the chamber 141. The cap is provided with a central recess to receive the upper end of the spring and the plate 155 and the wall of the recess is countersunk to receive the upper end of the valve cage 148 and which by engagement with the bottom of the countersink is clamped firmly in place. Ports 158, extending upwardly from the lower end of the cap to the recess in the cap establish restricted communication between the chamber 141 and the chamber 159 within the cap, and the upper chamber of the valve cage, so that fluid under pressure flowing through the restricted ports 149 may gradually build up pressure behind the piston 151 equal to the pressure in the chamber 141.

In the operation of the device illustrated in Fig. 15 the opening of the operating valve to the cylinder, when the control valve is also open as illustrated in Figs. 9 and 10, will permit the fluid under full pressure to flow through the inlet port 62 and conduit 58 to the cylinder and will exert full pressure upon the piston in the cylinder, thereby raising the hammer. The sudden flow of fluid under pressure through the inlet 61 will raise the ball valve 147 into engagement with the piston 151 and will force the piston upwardly against the tension of its spring 154. The fluid under pressure thus introduced into the cylinder to provide the initial lifting of the hammer is in excess of that required to raise it, and as the fluid pressure is built up in the conduit 58 and valve chamber 141 a restricted amount of such fluid under pressure will flow through the ports 158 into the chamber 159 back to the piston 151, and in addition to the tension of the spring will force the piston 151 and the ball toward its seat, thereby cutting down the area of the ports 149 and restricting the flow of fluid under pressure to the conduit 58 and thence to the cylinder. By thus restricting the fluid supplied to the cylinder during the upward movement of the piston the pressure in the cylinder is gradually reduced so that when the control valve is closed as the hammer approaches its predetermined height, it will gradually come to rest and will be sustained in elevated position by the fluid under pressure passing through the by-pass 85 to the cylinder.

The check valve 147 in both these constructions are safety devices and seat immediately upon failure of supply of fluid under pressure or improper reduction of pressure in such supply to prevent back flow through the inlet which would permit an improper sudden dropping of the hammer.

One of the most important features of the invention is to provide fluid-actuated trip mechanism for the operating valve and means co-ordinated with such mechanism for properly operating the control valve to provide for the introduction of fluid under full pressure when the hammer strikes its blow in order to catch it upon its bound and continue its upward movement and to cut off the supply of fluid to the cylinder as the hammer approaches its dropping height sufficiently before it reaches its full upward movement to enable the hammer to come to rest without causing any part of the hammer mechanism injuriously to strike the cylinder-supporting cross beam.

This is accomplished in the present invention by providing the control valve rod 101 with adjustable means, preferably a spiral cam, adapted to be engaged by a pin upon the hammer during the upward movement of the hammer to rotate the control valve to the closed position illustrated in Fig. 7, thereby cutting off the main supply of fluid under pressure through the conduit 58 so that further upward movement of the hammer will be produced only by the normal expansion of the fluid in the cylinder, the momentum of the hammer, and such restricted amount of fluid under pressure as passes through the by-pass 85.

Thus a slow final upward movement of the hammer will be produced which will raise the hammer gradually until the upward movement thereof is limited by the engagement of a stop collar on the piston rod with the under face of the cylinder-supporting beam.

Upon downward movement of the hammer the cam will be again engaged and rotated in the opposite direction to open the control valve, thereby permitting fluid under full pressure to flow through the conduit 58 to the operating valve which remains in a closed position until the instant the hammer strikes its blow.

Means are provided for rotating the operating valve to open position instantly when the hammer strikes its blow and by reason of the fact that the conduit 58 is filled with fluid under full pressure as far as the operating valve, the fluid under pressure will flow into the cylinder immediately upon the opening of the operating valve in such volume and at such pressure as to catch the hammer upon its bound or bounce and thereafter continue its upward movement until the fluid under pressure is again cut off by the actuation of the control valve above described.

In order to rotate the operating valve from exhaust position to normal position to admit fluid under pressure into the cylinder, the rod 97 of the operating valve has adjustably secured to it a sleeve 160, (see Figs. 1, 2, and 15,) having upon it a cam 161 adapted to be engaged by a lug or pin 162 which desirably is detachably secured to one of the lower bearing members 5 of the hammer.

A preferred form of pin, which is illustrated herein, is in the form of a truncated cone having a stem which is seated in a boss in the bearing 5. In order to facilitate the removal of the pin a hole 163 is bored in the boss at an angle to the axis of the socket to communicate with the lower portion of said socket, whereby a driving pin may be inserted to engage the end of the stem of the pin 162 and force it from its seat.

The sleeve is adjustably secured to the rod 97 by set screws 164, the ends of which extend into the vertical groove 165 in the operating rod 97, so that the cam may be adjusted to any desired height to permit the use of dies of different heights and to insure the admission of sufficient fluid under pressure into the cylinder instantly to raise the hammer as it bounces from the anvil.

Vibration of the valve-operating rod 97, due to the engagement of the pin 162 with the cam 161, is prevented by a bracket 166, (see Figs. 1 and 18,) which partially embraces the valve-operating rod and is adjustably secured to a vertical column 167 which is seated at its lower end in the base and at its upper end in the cylinder-supporting beam 8. The vertical column 167 desirably is also provided with a groove and key 168 adapted to receive the end of set screws 169 which adjustably clamp the bracket upon the column. Obviously the bracket 166 and the sleeve 160 of the cam may be adjusted together at any desired height properly to time the rotation of the operating valve relatively to the instant of impact of the hammer.

The control valve is actuated through a similar cam upon a sleeve 170 which is adjustably secured by set screws to the rod 101. This cam is engaged by a pin 171 upon the upper bearing member 6 of the hammer, the pin 171 being of similar construction and mounted in a similar manner to the pin 162. A steadying bracket 172 adjustably mounted upon the column 167 engages the control valve operating rod 101 immediately beneath the sleeve 170 and prevents vibration of the rod by the engagement of the pin 171 with the cam on the sleeve 170.

The adjustment of the cam sleeve 170 permits the supply of fluid under pressure to the cylinder to be cut off when the hammer reaches any predetermined height so that the final movement of the hammer will be sufficiently retarded to enable it to be arrested at a predetermined dropping height by the engagement of the stop sleeve on the piston rod with the under face of the cylinder-supporting beam.

The engagement of the pin 171 with the cam upon the sleeve 170 operates during the upward movement of the hammer to rotate the control valve thirty degrees which is sufficient to close the conduit 58 and to establish communication through the ports 80 and 82 of the control valve and the pipe 84 with the mechanism for actuating the operating valve.

The rod 101 through which the control valve is actuated desirably is provided with a collar 173 having a flat face 174 adapted to be engaged by the flat face of a spring-pressed plunger 175 which is mounted upon the plate 102 and acts normally to hold the operating valve in normal open position and to prevent overthrow of the valve, (Fig. 13.)

By reason of the construction above described the direct supply of fluid under pressure from the fluid inlet 62 to the operating valve 67 is cut off by the control valve when the upper pin 171 on the hammer engages the cam upon the sleeve 170 and rotates the control valve 66 to the position illustrated in Fig. 7. The hammer is then carried through the remainder of its upward movement by the reduced volume of fluid under pressure which passes through the by-pass 83 around the control valve and by the expansion of the fluid within the cylinder and the momentum of the hammer.

The piston rod 14 has secured to it an adjustable stop collar 176 which is adapted to engage a boss 177 extending downwardly from and integral with the cylinder-supporting beam 8 and thereby limit the upward movement of the hammer and determine its dropping position, (Fig. 16.)

By adjusting the position of the stop collar 176 and the cam sleeve 170 the height from which the hammer is to be dropped may be adjusted.

When the hammer is dropped by rotating the operating valve 65 to exhaust position, as illustrated in Fig. 8, the pin 171 will, during the initial downward movement of the hammer, engage the cam upon the sleeve 170 on the control valve rod 101 and rotate the control valve into open position illustrated in Fig. 9, thereupon permitting full pressure to be established upon the closed operating valve 65, so that when it is opened by engagement of the pin 162 with the cam 161, as the hammer strikes its blow, fluid under full pressure will flow into the cylinder and pick up the hammer upon its bounce from the anvil.

The various positions of the operating and control valves during the raising and lowering of the hammer are illustrated in Figs. 6, 7, 8, and 9, and the operation of the hammer may be briefly described with reference to them as follows:—

When the hammer is resting upon the anvil the control and operating valves are in the position illustrated in Fig. 6. The valve 140 in the main pressure supply line is then opened and air under pressure flows into the cylinder through the conduit 58 and thereupon raises the hammer.

As the hammer approaches the upward limit of its movement, as determined by the position at which the adjustable cam sleeve 170 is set, and by the adjustable stop 176 upon the piston rod stem, the upper pin 172 of the hammer will engage the cam upon the sleeve 170 and rotate the control valve into the position illustrated in Fig. 7, thereby cutting off direct supply of fluid under pressure from the inlet to the operating valve through the conduit 58. The final upward movement of the hammer will be continued by the expansion of the fluid under pressure beneath the piston and by the momentum of the hammer and by the fluid under pressure supplied through the by-pass 85 until the stop collar 176 engages the boss 177 on the cylinder-supporting beam 8. The hammer will then be sustained in its raised position by the fluid under pressure which flows through the restricted by-pass 85 and through the operating valve 65 into the cylinder.

When the control valve is in this closed position with respect to the conduit 58 communication is established through the ports 80 and 82 of the control valve with the pipe 84 which leads to the trip mechanism. The rotatable valve 123 of the trip mechanism will then be in normally closed position, as illustrated in Fig. 14, with the pedal raised and the spring-actuated hand-operated valves 136 and 139 closed.

If the trip mechanism is to be operated by the pedal downward pressure of the pedal will rotate the valve 123 to open position which will permit the fluid under pressure to pass through the trip valve 123 and pipe 126 into the chamber 104 of the valve-actuating mechanism, thereby forcing the piston 106 outwardly to the right, Fig. 13, thus causing the stud 113 to engage the cam face of the arm 114 on the rod 97 and rotate the operating valve to open or exhaust position.

During the rotation of the valve-actuating rod 97 the plunger 120 will be forced backwardly until the corner, formed by the flat face 118, passes the axis of the plunger, after which the operating valve will be held in full exhaust position by the pressure of the spring-actuated plunger and the hammer will drop.

The rate at which the hammer is permitted to drop may be regulated by adjustment of the valve 72 of the exhaust nozzle through the lever 78 so that the force of the hammer blow may be accurately adjusted.

During its initial descent the upper pin 171 on the hammer head will again engage the cam on the sleeve 170 and rotate the control valve to open position, as illustrated in Fig. 9, thereby establishing a full force of fluid under pressure against the surface of the closed operating valve 65. At the same time the rotation of the control valve cuts off communication from the port 80 of the control valve to the pipe 84 which leads to the operating valve actuating mechanism.

When, upon the opening of the trip valve 123 as above described, fluid under pressure is admitted into the chamber 104 of the trip mechanism the piston 106 of the trip mechanism is forced beyond the port 115 and as the supply of fluid under pressure through the pipe 84 has been cut off the fluid pressure in the chamber 104 will be rapidly reduced and the piston 106 restored to normal position by expansion of the spring 107, the remaining fluid in the chamber 104 escaping through the constantly open vent port 116. The vent port 116 desirably is made or adjusted to such size as to permit the fluid under pressure to escape with sufficient rapidity to prevent a second actuation of the piston 106 which otherwise might occur by expansion of the fluid in the chamber 104 after the control valve 66 has cut off the supply of fluid thereto through the pipe 84. The vent also will prevent improper actuation of the piston 106 by any leakage which might occur around the control valve when the latter is closed.

When the hammer approaches the anvil the lower pin 162 upon the hammer will engage the cam 161 and quickly rotate the operating valve from exhaust to normal position, thereby permitting the fluid under pressure, which is acting with its full force upon the operating valve, immediately to enter the cylinder as the bow is struck and thereupon pick up the hammer during its bounce and continue to raise it in the manner heretofore described.

It will be obvious that if the pedal is held in depressed position the operating valve, and control valve, will be repeatedly operated in the sequence above described to cause the hammer automatically to deliver repeated blows. If a single blow is to be struck the pedal is depressed and immediately released.

The same control may be accomplished by actuation of the hand-operated valves 136 and 137 when the trip mechanism is not used.

It will be obvious that by adjusting the valve 140, which controls the supply of fluid under pressure to the cylinder, the rate of fluid supplied may be regulated to vary the speed of the lift of the hammer. By adjusting the height of the sleeves 170 and the collar 176 on the piston rod the height from which the hammer is to fall may be adjusted. By adjusting the lever 78 which controls the valve 72 of the exhaust port the rate of exhaust of the fluid from the cylinder may be varied to permit the hammer to drop at a maximum speed or at any desired speed, so that the hammer can be caused to deliver a blow of any desired force.

Desirably means are provided for supporting the hammer at a distance from the anvil to permit the die blocks to be assembled upon the anvil and hammer and to be removed therefrom without danger of the dropping of the hammer, and also to provide a safety device for preventing the descent of the hammer if the operator is working upon the dies while the hammer is raised with the supply of fluid under pressure to the hammer shut off, or if the piston rod breaks or the piston becomes detached.

In the present construction a post 178 is rotatably mounted at its lower end in a socket in a stand 179 which is bolted to the base 1 and is rotatably mounted at its upper end in a suitable socket in the cylinder-supporting beam 8 (not shown). A split sleeve 180 is adjustably secured to the post 178 by clamping bolts 181 extending through flanges 182 and 183 on said sleeve. The sleeve is secured from rotation upon the post by a key or feather 184. The sleeve 180 is provided with a laterally extending arm 185 which is adapted upon rotation of the post 178 to be positioned beneath the lower face of the hammer. A suitable handle 185x is secured to the post 178 to enable the operator to rotate the arm 185 into the hammer-supporting position illustrated in full lines in Figs. 2 and 3, or to the inoperative position illustrated in dotted lines in Fig. 3.

The hammer may be lowered to rest upon the arm 185 by closing the valve 140 in the main supply pipe 63 whereby the weight of the hammer will cause sufficient leakage from the cylinder to permit the hammer gradually to descend, or it may be lowered upon the supporting arm 183 by other means hereinafter to be described.

An important feature of the operation of the mechanism herein described resides in the capability of controlling the descent of the hammer by manual operation of the exhaust valve. When the hammer is sustained at the predetermined dropping height the operating valve is normally open to supply fluid under pressure to the cylinder and closes the exhaust port. The exhaust valve 72 may be rotated to closed position by moving the lever 78. The operating valve may then be rotated toward exhaust position. If the exhaust valve is moved quickly to exhaust position by the lever 78 the hammer will be caused to drop and strike a full blow. As the blow is struck the operating valve will be rotated to open position to again supply fluid under pressure to the cylinder and raise the hammer. Thus single blows can be struck by operating the exhaust valve. The lever 78 may, however, be given a gradual limited movement to permit the air slowly to escape from the exhaust port so that the hammer will be gradually lowered. By manipulation of the exhaust valve and the valve 140 in the fluid supply pipe 63 the hammer may be balanced at any desired height.

It is often desirable to obtain an impression of the dies, before the same are hardened, by a short sharp blow. This may readily be accomplished when the hammer is raised by actuating the lever 78 to close the exhaust valve, then actuating the trip mechanism to turn the operating valve to exhaust position, then opening the exhaust valve gradually to permit the hammer to descend slowly to a desired height, and then quickly opening the exhaust valve, whereupon the hammer will drop to produce the desired sharp blow and upon impact will be returned to the normal dropping height as the pin 162 upon the hammer will engage the spiral cam 161 and rotate the operating valve to the position in which fluid under pressure is admitted to the cylinder.

By gradual opening of the exhaust valve in the manner above described the hammer may be lowered slowly to rest upon the supporting arm 185. When the hammer is so lowered the operating valve will remain in exhaust position so that admission of fluid under pressure by manipulation of the trip mechanism will not raise the hammer.

Another important object of the invention is to provide means for rotating the operating valve to normal position to raise the hammer and also to provide means by which the operating valve may be actuated manually to drop the hammer or to permit it gradually to descend. This is accomplished by providing the operating valve rod with an arm or handle 186 which desirably is secured to the sleeve 160 having the spiral cam 161. Obviously when the operating valve is in exhaust position it may be rotated to normal position to supply fluid to the cylinder by moving the lever 186 in the proper direction. Thus the hammer may be raised from the supporting arm 185 to dropping position. If the handle is moved in the opposite direction to rotate the operating valve toward exhaust position the hammer will be permitted to drop and such dropping movement may be regulated by the movement of the handle 186 either to drop the hammer to strike a full blow, or by limited movement of the lever 186 to rotate the operating valve toward exhaust position more slowly and thereby permit the hammer gradually to descend.

A further object of the invention is to provide a safety device which will prevent rotation of the operating valve and valve rod when the dies are being assembled or adjusted, or at any other time when it is desirable that the operation of the hammer shall be prevented.

A preferred means, which is illustrated in Figs. 17 and 18, comprises a U-shaped stop having a vertical leg 187 which is slidably mounted in a vertical hole extending through the bracket 166 in proximity to the sleeve 160 of the operating valve-actuating cam 161 and adapted, when in the position illustrated in Fig. 18, to engage a boss 188 through which the set screw 164 clamps the sleeve 160 upon the rod 97.

The upper end of the leg 187 is bent laterally and downwardly to provide a horizontal portion 189 and a downwardly extending leg 190 forming the U. The leg 190 is separated sufficiently from the leg 187 to clear the edge of the bracket 166 and permit the lower end of the leg 187 to lie in the path of the boss 188 as above described. The leg 190 is, however, of such length that when the U-shaped stop 189 is raised, the lower end 187 of said leg will clear the boss 188. The U-shaped portion may be rotated laterally and the lower end of the leg 190 dropped into a suitable socket 191 in the upper face of the bracket and thereby held in inoperative position during the normal operation of the machine.

When the hammer is sustained at its dropping height by the fluid under pressure flowing through the by-pass 85, it may also be permitted gradually to descend by closing the valve 140 in the main fluid supply pipe 63 in which case the weight of the hammer will cause the fluid gradually to leak out of the cylinder.

The provision of safety devices for drop hammers is obviously of exceeding importance as any improper operation of the hammer is likely to injure the operator seriously. Several safety means are, therefore, provided in the present invention to prevent improper dropping of the hammer, in addition to those above described, among which the following may be mentioned.

The inlet is provided with a check valve which will prevent sudden dropping of the hammer upon failure or improper reduction of fluid supply as has been heretofore described.

The main fluid supply pipe 63 is provided with a valve 140 by means of which the supply of fluid to the cylinder may be entirely cut off.

Rotation of the exhaust valve to closed position by the handle 78 will prevent sudden dropping of the hammer.

The pipe 84, from which fluid is supplied from the cylinder to the trip mechanism, is provided with a valve 192 which when closed will prevent the actuation of the trip mechanism.

The hand-operated levers 138 and 139 are both required to be actuated by the hands of the operator to cause the hammer to drop.

The vent port 116 in the cylinder 103 serves to prevent improper dropping of the hammer to produce a secondary blow which might injure the operator.

The cylinder is provided, adjacent its upper end, with a series of large ports which permit the rapid escape of fluid under pressure if the piston is raised above such ports, as for example by detachment of the piston from the piston rod, or detachment of the piston rod from the hammer, or by breakage of the piston rod. When pressure in the cylinder is thus released further upward movement of the piston will be due substantially only to its inertia. Under such circumstances the piston is prevented from being thrown out of the end of the cylinder by the cap which is of a rigid character and firmly clamped down upon the top of the cylinder.

It will, therefore, be obvious that by reason of these various expedients the hammer is fully safeguarded from accidental operations which will be likely to injure the operator.

Another feature of the invention consists in providing novel means for supplying lubricant to the trip mechanism. The trip mechanism is enclosed in a box or housing 193. An oil cup or reservoir 194, having a stem 195 provided with a suitable hand-operated cock 196, communicates with the union 197 which leads to the conduit 121 which supplies the air under pressure to the trip valve 123.

When the hammer is to be started the cock 196 is opened and quickly closed to permit a small amount of oil to enter the union 197 so that when the trip valve 123 is opened the oil will be carried with the fluid under pressure through the trip valve and pipe 126 into the cylinder 104 and blown through the exhaust port 116 in the form of a fine mist into the chamber of the housing or casing. The oil thus introduced will lubricate all of the relatively moving parts of the trip mechanism.

It will be understood that the embodiments of the invention particularly disclosed herein are of an illustrative character and are not restrictive, and that various changes in form, size, construction and arrangement of parts may be made within the spirit and scope of the following claims.

Having thus described the invention, what is claimed as new, and desired to be secured by Letters Patent, is:

1. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder to raise said hammer or to exhaust said fluid therefrom to permit the hammer to drop, means operable only by the pressure of the fluid supplied to said cylinder when the hammer is maintained in raised position to actuate said operating valve to exhaust position, and means for controlling the supply of fluid under pressure to said valve-actuating means.

2. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder to raise said hammer or to exhaust said fluid therefrom to permit the hammer to drop, means operable only by the pressure of the fluid supplied to said cylinder when the hammer is maintained in raised position to actuate said operating valve to exhaust position, manually controlled means for supplying fluid under pressure to said valve-actuating means when the hammer is in raised position, and means operable by the descending hammer to cut off the fluid pressure supplied to said valve-actuating means.

3. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder to raise said hammer or to exhaust said fluid therefrom to permit the hammer to drop, means operable only by the pressure of the fluid supplied to said cylinder when the hammer is maintained in raised position to actuate said operating valve to exhaust position, means for supplying fluid under pressure to said valve-actuating means when the hammer is in raised position, and a trip valve for controlling the admission of fluid under pressure to said valve-actuating means.

4. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder to raise said hammer or to exhaust said fluid therefrom to permit the hammer to drop, means operable only by the pressure of the fluid supplied to said cylinder when the hammer is maintained in raised position to actuate said operating valve to exhaust position, means for supplying said fluid under pressure to said valve-actuating means when the hammer is in raised position, and manually operable controlling means, requiring simultaneous use of both hands of the operator, to admit fluid under pressure to said actuating means.

5. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder to raise said hammer or to exhaust said fluid therefrom to permit the hammer to drop, means operable only by the pressure of the fluid supplied to said cylinder when the hammer is maintained in raised position to actuate said operating valve to exhaust position, means for supplying said fluid under pressure to said valve-actuating means when the hammer is in raised position and selectively operable controlling means for admitting fluid under pressure to said valve-actuating means including a pedal-actuated trip valve and manually operable valves requiring simultaneous use of both hands of the operator.

6. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder to raise said hammer or to exhaust said fluid therefrom to permit the hammer to drop, a control valve intermediate of said fluid pressure supply and said operating valve, means operable by said hammer, when lifted to a predetermined height, to cause said control valve to close said conduit, and upon the dropping of the hammer to open said conduit, means operable by the pressure of the fluid supplied to said cylinder after the control valve has closed the conduit through which fluid under pressure is supplied to the cylinder to actuate said operating valve to exhaust position, and manual means for controlling the admission of fluid under pressure to the means for actuating said operating valve.

7. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder to raise said hammer or to exhaust said fluid therefrom to permit the hammer to drop, a control valve intermediate of said fluid pressure supply and said operating valve, means operable by said hammer, when lifted to a predetermined height, to cause said control valve to close said conduit, and upon the dropping of the hammer to open said conduit, a restricted by-pass leading around said control valve to supply sufficient fluid under pressure to said cylinder to maintain the hammer in raised position, means operable only by the pressure of the fluid supplied to said cylinder when the control valve is in closed position and the hammer maintained in raised position to actuate said operating valve to exhaust position, and manual means for controlling the admission of fluid under pressure to the means for actuating said operating valve.

8. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid therefrom, fluid pressure trip mechanism communicating with said conduit and supplied with fluid under pressure therefrom having means for actuating said operating valve to exhaust position, a control valve in said conduit having ports for alternatively establishing communication between the cylinder and the fluid supply and between the cylinder and said trip mechanism, and means operable by the reciprocating movement of said hammer to actuate said control valve and said operating valve in sequence to establish communication between said cylinder and said fluid supply to raise the hammer, and manually operable means for causing said fluid-actuated trip mechanism to move said operating valve to exhaust position to drop the hammer.

9. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid therefrom, fluid pressure trip mechanism communicating with said conduit and supplied with with fluid under pressure therefrom having means for actuating said operating valve to exhaust position, a control valve in said conduit having ports for alternatively establishing communication between the cylinder and the fluid supply and between the cylinder and said trip mechanism, means operable by the reciprocating movement of said hammer to actuate said control valve and said operating valve in sequence to establish communication between said cylinder and said fluid supply to raise the hammer, manually operable means for causing said fluid-actuated trip mechanism to move said operating valve to exhaust position to drop the hammer, and means operable by the descending movement of the hammer to restore the trip mechanism to inoperative position.

10. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid therefrom, fluid pressure trip mechanism communicating with said conduit and supplied with fluid under pressure therefrom having means for actuating said operating valve to exhaust position, a control valve in said conduit having ports for alternatively establishing communication between the cylinder and the fluid supply of said trip mechanism, means located at a predetermined height operable by the ascending movement of the hammer to cause said control valve to shut off communication between said cylinder and the fluid pressure supply, and to establish communication between said cylinder and said trip mechanism, and manually controlled means for causing said trip mechanism to move said operating valve to exhaust position to drop said hammer and simultaneously to close said fluid supply conduit.

11. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid therefrom, fluid pressure trip mechanism communicating with said conduit and supplied with fluid under pressure therefrom having means for actuating said operating valve to exhaust position, a control valve in said conduit having ports for alternatively establishing communication between the cylinder and the fluid supply and between the cylinder and said trip mechanism, means operable by the reciprocation of said hammer to cause said control valve to shut off the fluid supply conduit and establish communication with the trip mechanism when the hammer is above a predetermined height and to shut off the fluid pressure supply to said trip mechanism and to open said fluid supply conduit to said cylinder when the hammer descends below said predetermined height, and manually controlled means for causing said trip mechanism to move said operating valve to exhaust position to drop said hammer and to close said fluid supply conduit.

12. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid therefrom, fluid pressure trip mechanism communicating with said conduit and supplied with fluid under pressure therefrom having means for actuating said operating valve to exhaust position, a control valve in said conduit having ports for alternatively establishing communication between the cylinder and the fluid supply and between the cylinder and said trip mechanism, means operable by the ascending movement of the hammer at a predetermined height to cause said control valve to shut off communication between said fluid pressure supply and said cylinder and to establish communication between said cylinder and said trip mechanism, a restricted by-pass for fluid under pressure in said conduit around said control valve operable when the valve is closed to the fluid supply to by-pass sufficient fluid under pressure to maintain said hammer in raised position and to supply fluid under pressure to said trip mechanism, and manually controlled means for admitting fluid under pressure to said trip mechanism to cause the same to move said operating valve to exhaust position to drop the hammer.

13. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid therefrom, fluid pressure trip mechanism communicating with said conduit having means for actuating said operating valve to exhaust position, a control valve in said conduit having ports for alternatively establishing communication between the cylinder and the fluid supply and between the cylinder and said trip mechanism, means operable by the ascending movement of said hammer at a predetermined height to cause said control valve to close said fluid pressure supply conduit and to supply fluid under pressure to said trip mechanism and operable during the initial downward movement of said hammer to open said fluid supply conduit to said operating valve and to close communication with said trip mechanism, and thereby render said trip mechanism inoperative, manually controlled means for causing said trip mechanism to move said operating valve to exhaust position and to close said conduit, and means operable by the descending hammer slightly before it strikes its blow to open said fluid pressure conduit to said cylinder to raise the hammer and thereby prevent the hammer from striking a secondary blow and in co-operation with said control valve to prevent release of the hammer before it has been raised to a predetermined height.

14. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid pressure therefrom, a trip mechanism comprising a fluid pressure chamber having means communicating with said fluid pressure supply, a piston in said chamber, a spring acting upon said piston in opposition to the fluid under pressure in said chamber, manually operable means for controlling the admission of fluid under pressure to said chamber, means operable by the movement of said piston by fluid under pressure to actuate said operating valve, and means for reducing the fluid pressure in said chamber to avoid improper actuation of said piston and the production of a repeated blow.

15. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid pressure therefrom, a trip mechanism comprising a fluid pressure chamber having means communicating with said fluid pressure supply and provided with a vent port, a piston in said chamber, a spring acting upon said piston in opposition to the fluid under pressure in said chamber, an exhaust port leading from said chamber, manually operable means for controlling the admission of fluid under pressure to said chamber, means operable by the movement of said piston by fluid pressure to actuate said operating valve, a casing enclosing said trip-actuating mechanism, and means for temporarily introducing oil into said chamber, whereby the exhaust of fluid under pressure through said vent port will spray said oil into said casing and thereby completely lubricate the trip-actuating mechanism.

16. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid pressure therefrom, a trip mechanism comprising a fluid pressure chamber having means communicating with said conduit, a control valve in said conduit, and means for actuating the same to deliver fluid under pressure from said cylinder to the chamber of said trip mechanism only when the hammer is raised above a predetermined height, a piston in said chamber, manually operable means for controlling the admission of fluid under pressure from said conduit to said chamber to actuate said piston, means operable by the movement of said piston under fluid pressure to move said operating valve to exhaust position, means for restoring said piston to inoperative position upon the dropping of the hammer, and means for reducing the fluid pressure in said chamber to avoid improper actuation of said piston and the production of a repeated blow.

17. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to supply fluid under pressure to said cylinder or to exhaust said fluid pressure therefrom, a trip mechanism comprising a fluid pressure chamber having means communicating with said conduit, a control valve in said conduit, and means for actuating the same to deliver fluid under pressure from said cylinder to the chamber of said trip mechanism only when the hammer is raised above a predetermined height, a piston in said chamber, manually operable means for controlling the admission of fluid under pressure from said conduit to said chamber to actuate said piston, means operable by the movement of said piston under fluid pressure to move said operating valve to exhaust position, a spring for restoring said piston to inoperative position upon the dropping of the hammer, and means operable during the descent of the hammer for moving said operating valve from exhaust position to position to admit fluid under pressure to said cylinder.

18. A drop hammer comprising a vertically reciprocable hammer, a cylinder having a piston connected to said hammer, a conduit communicating with said cylinder and having an exhaust port, means for supplying fluid under pressure to said conduit, a vertical cylindrical rotary valve in said conduit having a diametrical port therethrough, means for actuating said valve selectively to establish or to cut off communication between said fluid supply and said cylinder, a sleeve surrounding said valve and fitting the same with slight tolerance, radial ball bearings for said valve within and closely fitting said sleeve and located on opposite sides of said port, and a reservoir located above said valve and communicating with said bearings and with the bearing surfaces between said valve and sleeve operable to maintain by gravity continuous lubrication of said bearings and to maintain an oil seal between said valve and said sleeve, and to said valve to effect and maintain an oil seal between said valve and its casing.

19. A drop hammer comprising a vertically reciprocable hammer, a cylinder having a piston connected to said hammer, a conduit communicating with said cylinder and having an exhaust port, means for supplying fluid under pressure to said conduit, an operating valve in said conduit selectively operable to establish communication between said cylinder and said fluid pressure supply or between said cylinder and said exhaust port, check valve mechanism intermediate of said operating valve and said fluid pressure supply comprising a chamber having a vertical inlet port, a vertical valve cage in said chamber communicating at its lower end with said inlet port and having a lateral opening communicating with said conduit, a valve seat at the lower end of said cage, and a ball valve freely movable in said valve cage adapted to be supported away from said valve seat by the pressure of the fluid flowing through said inlet port, and means for controlling the movement of said valve operable to regulate the volume of fluid under pressure supplied to said cylinder.

20. A drop hammer comprising a vertically reciprocable hammer, a cylinder having a piston connected to said hammer, and means for supplying fluid under pressure to actuate said piston, a cylinder-supporting beam, means securing said cylinder to said beam, a wide sleeve fitting the lower portion of said cylinder, and re-enforcing the same, means for rigidly securing said sleeve to said beam, and means for rigidly securing the upper end of said cylinder to said sleeve.

21. A drop hammer comprising a vertically reciprocable hammer, a cylinder having a piston connected to said hammer, means for supplying fluid under pressure to actuate said piston, a cylinder-supporting beam having a socket extending downwardly therein to receive and to fit a substantial portion of the lower end of said cylinder, a wide sleeve fitting said cylinder provided with upper and lower flanges, bolts connecting said lower flange to said beam, a cap for said cylinder, and means rigidly connecting said cap to the upper flange of said sleeve.

22. A drop hammer comprising a vertically reciprocable hammer, a cylinder having a piston connected to said hammer, means for supplying fluid under pressure to actuate said piston, a cylinder-supporting beam having a socket extending downwardly therein to receive and to fit a substantial portion of the lower end of said cylinder, a wide sleeve fitting said cylinder and having at its lower portion screw threaded engagement therewith and provided with upper and lower flanges, bolts connecting said lower flange to said beam, a cap for said cylinder, and means rigidly connecting said cap to the upper flange of said sleeve.

23. A drop hammer comprising a vertically reciprocable hammer, a cylinder having a piston connected to said hammer, means for supplying fluid under pressure to actuate said piston, a cylinder-supporting beam having a socket extending downwardly therein to receive and to fit a substantial portion of the lower end of said cylinder, a wide sleeve fitting said cylinder and having at its lower portion screw threaded engagement therewith and provided with upper and lower flanges, bolts connecting said lower flange to said beam, a cap for said cylinder, means rigidly connecting said cap to the upper flange of said sleeve, and a stuffing box at the upper end of said sleeve having an adjustable gland fitting said cylinder.

24. A drop hammer comprising a vertically reciprocable hammer, a cylinder having a piston connected to said hammer, a conduit having a branch communicating with said cylinder and a branch forming an exhaust port, means for supplying fluid under pressure to said conduit, a vertical rotatable operating valve having ports arranged selectively to establish communication between said cylinder and said conduit or between said cylinder and said exhaust port, a vertical rod connected to said operating valve, means operable only by the pressure of the fluid supplied to the cylinder when the hammer is maintained in raised position to rotate said operating valve to exhaust position, means on said valve rod operable by the hammer as the hammer strikes its blow to rotate said operating valve in the reverse direction to establish communication with said cylinder and thereby raise the hammer, and a handle upon said operating rod operable to rotate said operating valve, and thereby manually control the raising and dropping of the hammer.

25. A drop hammer comprising a vertically reciprocable hammer, a cylinder having a piston connected to said hammer, a conduit having a branch communicating with said cylinder and a branch forming an exhaust port, means for supplying fluid under pressure to said conduit, a vertical rotatable operating valve having ports arranged selectively to establish communication between said cylinder and said conduit or between said cylinder and said exhaust port, a vertical rod connected to said operating valve, means operable only by the pressure of the fluid supplied to the cylinder when the hammer is maintained in raised position to rotate said operating valve to exhaust position, means on said valve rod operable by the hammer as the hammer strikes its blow to rotate said operating valve in the reverse direction to establish communication with said cylinder and thereby raise the hammer, and manually operable means for locking the operating valve against rotation to exhaust position when the hammer is in raised position.

26. A drop hammer comprising a vertically reciprocable hammer, a cylinder having a piston connected to said hammer, a conduit having a branch communicating with said cylinder and a branch forming an exhaust port, means for supplying fluid under pressure to said conduit, a vertical rotatable operating valve having ports arranged selectively to establish communication between said cylinder and said conduit or between said cylinder and said exhaust port, a vertical rod connected to said operating valve, means operable by the pressure of the fluid supplied to the cylinder to rotate said operating valve to exhaust position, a spiral cam on said valve rod, means on said hammer positioned to engage said cam as the hammer approaches the lower limit of its movement operable to rotate said operating valve to open position to supply fluid under pressure to said cylinder and thereby to raise said hammer, and releasable locking means operable when the hammer is in raised position to engage said cam and thereby prevent rotation of the operating valve to exhaust position.

27. A drop hammer comprising a vertically reciprocable hammer, a cylinder having a piston connected to said hammer, a conduit having a branch communicating with said cylinder and a branch forming an exhaust port, means for supplying fluid under pressure to said conduit, a rotatable operating valve having ports arranged selectively to establish communication between said cylinder and said conduit or between said cylinder and said exhaust port, a vertical rod connected to said operating valve, a handle on said operating rod, a vertical rotary valve for said exhaust port, a vertical valve rod connected to said exhaust valve having an angular port therethrough adapted to control the exhaust, and a handle on said exhaust valve rod operable to regulate the rate of exhaust of fluid from the cylinder whereby manual operation of said operating and exhaust valves will so control the operation of the hammer that it may be caused to strike a full blow, or a sharp blow from any desired height, or gradually to descend at a desired rate of sped.

28. A drop hammer comprising a vertically reciprocable hammer, a cylinder-supporting beam, a cylinder having a piston connected to said hammer extending into a socket in said beam, a reenforcing sleeve fitting said cylinder secured to said cylinder and said beam, means for supplying fluid under pressure to the lower end of said cylinder to raise said piston and hammer, ports in the wall of said cylinder located above the normal limit of upward movement of said piston adapted to permit the escape of fluid from said cylinder when the piston is raised above said ports and immediate reduction of pressure adapted to prevent the piston from being forcibly projected from the cylinder in case of breakage or detachment of the piston from the hammer, and a rigid cap secured upon the top of said cylinder by tension rods connected to said cap and to said sleeve adapted to arrest the piston within said cylinder.

WILLIAM H. J. FITZGERALD.
REGINALD P. FITZGERALD.